No. 740,495. PATENTED OCT. 6, 1903.
J. B. WARING.
REDUCING VALVE.
APPLICATION FILED MAR. 13, 1902. RENEWED MAR. 10, 1903.
NO MODEL.
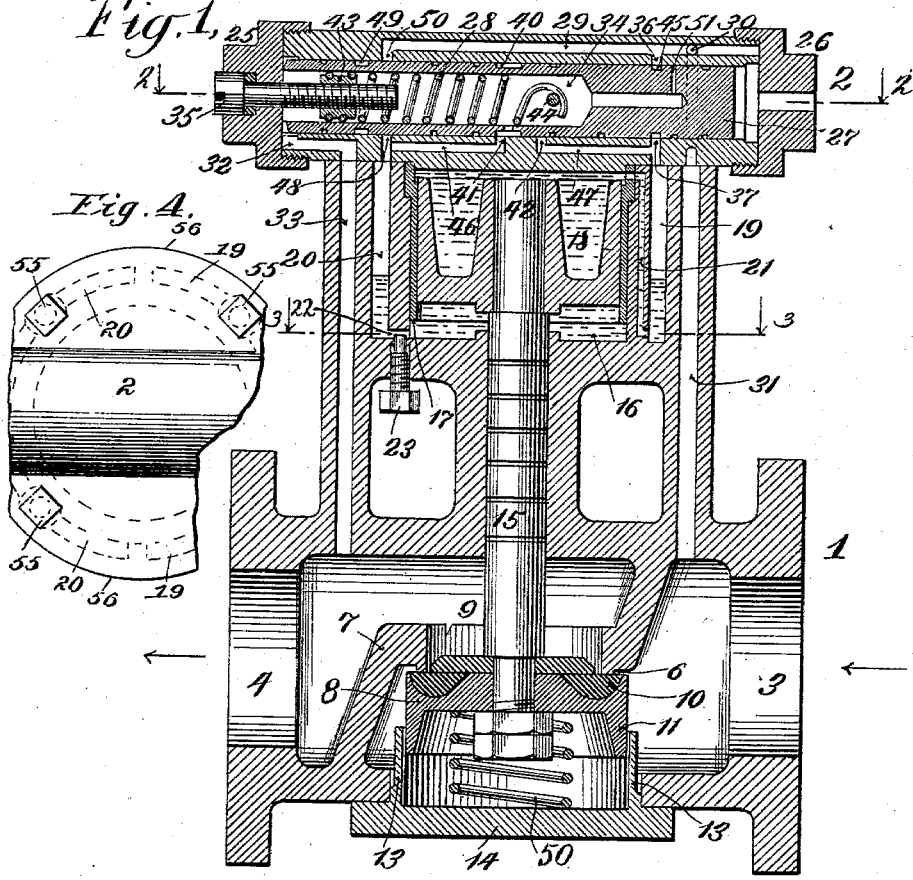
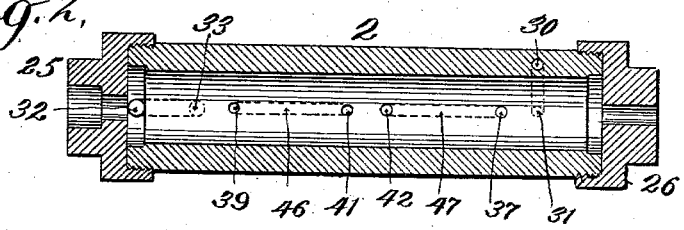
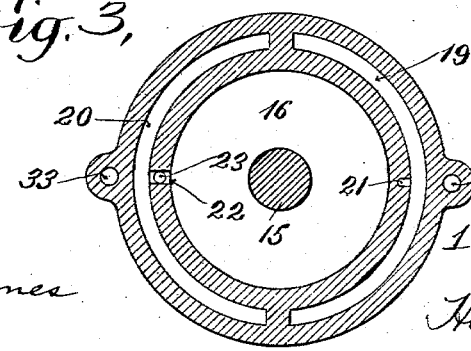
WITNESSES:
Harry Goss.
John H. Barnes
INVENTOR
John B. Waring
BY
Henry D. Williams
ATTORNEY No. 740,495.   Patented October 6, 1903.

UNITED STATES PATENT OFFICE.

JOHN B. WARING, OF EAST ORANGE, NEW JERSEY, ASSIGNOR, BY MESNE ASSIGNMENTS, TO WARING PATENTS COMPANY, OF NEW YORK, N. Y., A CORPORATION OF NEW YORK.

REDUCING-VALVE.

SPECIFICATION forming part of Letters Patent No. 740,495, dated October 6, 1903.

Application filed March 13, 1902. Renewed March 10, 1903. Serial No. 147,151. (No model.)

*To all whom it may concern:*

Be it known that I, JOHN B. WARING, a citizen of the United States, residing at East Orange, in the county of Essex and State of New Jersey, have invented certain new and useful Improvements in Reducing-Valves, of which the following is a specification, reference being had therein to the accompanying drawings.

This invention relates to valves adapted for the regulation or reduction of pressures and for controlling the flow of a fluid from a high pressure to a low pressure.

According to my invention the valve is actuated in both its opening and closing movements by the high-pressure fluid controlled by a governing device which is controlled by the low-pressure fluid.

My invention has for its objects steadiness and reliability of action, durability, readiness of adjustment, and other advantages, and includes various improvements in construction and in the combination of parts.

I will now describe a construction of valve embodying my invention illustrated in the accompanying drawings and will thereafter point out the novel features in claims.

Figure 1 is a vertical central section of the valve. Fig. 2 is a horizontal sectional view taken on the line 2 2 of Fig. 1 with the governing piston-valve removed. Fig. 3 is a horizontal sectional view taken on the line 3 3 of Fig. 1. Fig. 4 is a part-plan view of the top of the valve.

The casing of the valve comprises two parts, a body and neck 1 and a bonnet 2, these parts being suitably secured together and containing all of the operative parts of the valve. The particular means employed in the construction shown for securing the bonnet to the top of the neck of the body comprise bolts 55, passing through a flange 56 of the bonnet 2 and threaded into the top of the neck of the body 1. (See Fig. 4.) The body part of the casing is formed with an inlet 3 for the fluid under high pressure and an outlet 4 for the fluid under reduced or low pressure, the passage of fluid from the high pressure to the low pressure being controlled by a valve 8, working against the valve-seat 6, formed about the valve-opening 9 in the separating-partition 7. The face of the valve 8 where it engages the seat 9 is shown as formed with a groove in which a packing 10 is placed. The valve is also provided with an annular flange or apron 11, which fits loosely in an upwardly-extending annular flange 13, carried by or formed integral with the bottom cover 14. The purpose of the apron 11 and flange 13 is to cause the fluid passing from the high pressure to the low pressure to pass entirely around the valve instead of under it, thus avoiding any tendency to close the valve from the rapidly-moving current of fluid past the open valve. A spring 50 is located beneath the valve 8 and performs the function of holding the valve closed when not in use.

The valve 8 is mounted upon or carried by a stem 15, which extends upwardly through the neck of the casing 1 and is shown as provided with grooves to prevent leakage of the fluid along the stem. The upper end of the stem 15 projects into a chamber or cylinder 16, which is shown as provided with a metallic lining 17, preferably of brass. A piston 18 is located in the chamber 16 and is secured upon the stem 15, so that any movement of the piston will cause a corresponding movement of the stem and the valve 8, and the piston 18 has a sufficient vertical movement in the chamber 16 for the opening and closing of the valve 8. The upper face of the piston is shown as chambered and is designed to act as a fluid-receptacle receiving condensed fluid or charged with a fluid. On one side of the chamber 16 is a semi-annular chamber 19, and on the other side of the chamber 16 is another semi-annular chamber 20. The semi-annular chamber 19 is in communication with the upper end of the cylindrical chamber 16 above the upper face of the piston 18 through a passage and port 21, and the semi-annular chamber 20 is in communication with the lower end of the cylindrical chamber 16 below the lower face of the piston 8 through a port or short passage 22. The passage 22 is provided with adjustable means for restricting it, such means being shown as a valve or plug 23, threaded in the casing and having a contracted upper end adapted to project into the passage 22 and provided at its lower end with a head by means of which the screw may be turned to bring its contracted end into or out of the passage 22. The casing may be conveniently chambered in order that access may be had to the screw-valve 23.

The chamber 16, both above and below the piston 18 and the passages and ports leading thereto, will usually be charged with a liquid, which will be water of condensation where steam is the fluid passing through the valve, and the semi-annular chambers or passages 19 and 20 will also be at times charged or partially charged with such liquid, so that the piston 18 will be moved through pressure transmitted by this liquid, the actuating pressure of the vapor being exerted on the surface of the liquid in one or the other of the semi-annular chambers or passages 19 and 20. The piston is actuated in each direction by the high-pressure fluid, which is directed alternately upon the liquid in the semi-annular chambers or passages 19 and 20 by a controlling or governing device which is controlled by the low pressure.

The controlling or governing device is located in the bonnet 2 of the casing, which is shown as having a horizontally-arranged cylindrical chamber closed at its ends by caps 25 and 26. A reciprocating piston-valve 27 is fitted in this cylindrical chamber. The low-pressure fluid is admitted to this chamber through the passage 33, leading up through the neck of the casing and through a short passage 32 in the bonnet, terminating in a port entering the cylindrical chamber of the bonnet at the left-hand end thereof. The reciprocating governing-valve 27 has an inner chamber extending from the left or pressure end thereof nearly to the other end thereof, and the low-pressure fluid at all times freely enters this chamber 34 and exerts its pressure upon the governing-valve. This pressure upon the governing-valve is exerted against atmospheric pressure admitted to the cylindical chamber by an opening in the cap 26 at the right-hand end of the cylindrical chamber and against suitable resisting means, shown as a spring 28, engaging at one end with a nut 43 on a screw 35 and engaging at the other end with a cross-pin 44, secured in the governing-valve. The headed end of the screw 35 projects through a packed orifice in the cap 25 of the bonnet and may be readily actuated to vary the strength of the resisting device or spring, and the tension of the spring is so adjusted that when the low pressure is at the predetermined point the governing-piston will be held in medial position with all ports closed. As shown, the governing-piston is in extreme left-hand position, which would be its position with the valve under no pressure. The governing-valve is thus controlled by the low pressure. Under the control of the low pressure it admits the high-pressure fluid to actuate the main valve 8. A passage-way 31 is provided for the high-pressure fluid from the high-pressure chamber up through the neck of the casing and thence by a passage-way 30 in the bonnet partly around the cylindrical chamber of the bonnet and thence by a longitudinal passage-way 29 at the upper part of the bonnet to ports 36 and 50, adapted to coact with the governing-valve 27. In the position shown the governing-valve has opened the high-pressure port 36 for producing an opening movement of the main valve, and the high-pressure fluid passes from the port 36 through an annular groove or passage 45 of the governing-valve and through the lower port 37 in the bonnet 2 to the semi-annular chamber 19. The chamber 19 is, as aforesaid, in communication with the cylinder 16 above the valve-actuating piston 18, and the high pressure will thus be applied to the upper surface of the valve-actuating piston. At the same time the governing-valve will open communication from the lower end of the cylinder 16 to the low pressure by means of the annular groove or passage 40 on the governing-valve and the port 41 and passage 46 in the bonnet 2, it being observed that the annular groove or passage 40 of the governing-valve is in communication with the inner chamber 34 of the governing-valve, which, as aforesaid, has a free communication with the low-pressure side of the main valve. Thus the upper face of the valve-actuating piston 18 will receive the high pressure, while its lower face will be in free communication with the low pressure, and in consequence the piston will be moved downwardly, opening the main valve 8. It will be noted that these passages are so constructed that water of condensation will collect therein when steam is the fluid passing through the valve, and with a non-condensable fluid they may be charged with water or other liquid sufficiently to fill the cylinder 16 above and below its piston and to nearly fill the semi-annular chambers 19 and 20, so that the high pressure in the opening movement just described will be exerted upon the surface of liquid in the semi-annular chamber 19, and this pressure will be transmitted by the liquid to the upper face of the piston, and the liquid in the cylinder 16 below the piston will be forced out into the semi-annular chamber 20 through the restricted passage 22 under the control of the restricting screw-valve 23 above described. Thus I attain a steadiness of movement and an independence of slight and momentary variations of pressure, such as is highly desirable in valves of this character.

When the low pressure reaches the predetermined point, the resistance of the spring 28 will be sufficiently overcome to move the governing-valve toward the right and close the ports 37 and 41. When the predetermined low pressure is exceeded, the movement to the right will be further continued, so that the annular groove or passage 49 near the left end of the governing-valve will register with the upper high-pressure port 50 and the lower port 48, and this lower port 48 leads to the semi-annular chamber 20, which is, as aforesaid, in communication with the cylinder 16 below the valve-actuating piston 18. Therefore the high pressure will be exerted upon the lower face of the valve-actuating piston 18. At the same time the annular groove or passage 40 of the governing-valve will register with the port 42, and thereby the passage 47 and semi-annular chamber 19 will be opened into communication with the low-pressure chamber and any excess of pressure therein exhausted to the low pressure, and the preponderance of the high pressure below the valve-actuating piston 18 will cause an upward movement of the valve-actuating piston 18 and a movement of the main valve toward its seat. It will be observed that this movement is also controllable as to its speed by the restricting screw-valve 23, which now controls the entrance of the pressure-transmitting liquid to the cylinder 16.

From the above description it will be evident that the semi-annular chambers 19 and 20 are intermediate pressure-chambers, in each of which at times the high pressure is exerted and at other times the low pressure is exerted, and that they provide cushioning means to prevent jar or violent movement in the operation of the valve.

The governing-valve 27 is shown as provided with grooves to prevent leakage, and one of these grooves to the right of the high-pressure annular passages 45 has a passage 51 leading to the low-pressure chamber 34 in the interior of the governing-valve to convey to the low pressure any possible leakage of high-pressure fluid. Similarly, any leakage of high-pressure fluid from the annular passage 40 to the left will be conveyed to the low pressure at the low-pressure end of the governing-valve.

It is obvious that various modifications may be made in the construction shown and above particularly described within the spirit and scope of my invention.

What I claim, and desire to secure by Letters Patent, is—

1. A pressure-reducing valve comprising a casing having a high-pressure chamber and a low-pressure chamber, a valve controlling the communication between said chambers, a valve-actuating piston connected with the valve and located in a chamber in the casing, the casing being provided with a passage leading to the piston-chamber at one side of the piston and having a port above the piston and another passage leading to the piston-chamber at the other side of the piston and having a port above the piston, a governing device comprising a reciprocating valve controlled by the low pressure and coöperating with such ports of the casing to direct the high pressure through one or the other of the passages leading to the piston-chamber.

2. A pressure-reducing valve comprising a casing having a high-pressure chamber and a low-pressure chamber, a valve controlling the communication between said chambers, a valve-actuating piston connected with the valve and located in a chamber in the casing, the casing being provided with a passage leading to the piston-chamber at one side of the piston and having a port above the piston and another passage leading to the piston-chamber at the other side of the piston and having a port above the piston, each of such passages having an enlargement forming a pressure-chamber therein between its port and the piston-chamber, and a governing device controlled by the low pressure and coöperating with such ports of the casing to direct an expansive fluid through such passages.

3. A pressure-reducing valve comprising a casing having a high-pressure chamber and a low-pressure chamber, a valve controlling the communication between said chambers, a valve-actuating piston connected with said valve and located in a chamber in the casing adapted to retain a liquid at each side of the piston, the casing being provided with a passage leading to the piston-chamber at one side of the piston and having a port above the piston and another passage leading to the piston-chamber at the other side of the piston and having a port above the piston, a governing device controlled by the low pressure and coöperating with such ports of the casing to direct the high pressure through one or the other of the passages leading to the piston-chamber, and adjustable means for restricting the resulting movement of the liquid in the piston-chamber, such adjustable means controlling one of such passages in proximity to the piston-chamber.

4. A pressure-reducing valve comprising a casing having a high-pressure chamber and a low-pressure chamber, and a valve opening between such chambers, a valve constructed to close said opening by movement toward the low-pressure chamber, an apron on said valve and a coacting wall on the casing located in the high-pressure chamber, whereby the fluid is directed around the edges of the valve in its movement in the high-pressure chamber toward the valve-opening, a valve-actuating piston connected with the valve and working in a chamber in the casing, and a governing device controlled by the low pressure so as to alternately direct fluid under pressure against opposite faces of the piston.

5. A pressure-reducing valve comprising a casing having a high-pressure chamber and a low-pressure chamber, a valve controlling the communication between said chambers, a valve-actuating piston connected with the valve and located in a chamber in the casing, the casing being provided with a passage leading to the piston-chamber at one side of the piston and having a high-pressure port and a low-pressure port above the piston and another passage leading to the piston-chamber at the other side of the piston and having a high-pressure port and a low-pressure port above the piston, and a laterally-balanced reciprocating governing-piston subjected to the low pressure at one end thereof and coöperating with such ports of the casing to open communication at one or the other high-pressure port with the high-pressure chamber and to open communication at one or the other low-pressure port with the low-pressure chamber.

6. A pressure-reducing valve comprising a casing having a high-pressure chamber and a low-pressure chamber, a valve controlling the communication between said chambers, a valve-actuating piston connected with the valve and located in a chamber in the casing, the casing being provided with a passage leading to the piston-chamber at one side of the piston and having a high-pressure port and a low-pressure port above the piston and another passage leading to the piston-chamber at the other side of the piston and having a high-pressure port and a low-pressure port above the piston, each of such passages having an enlargement forming a pressure-chamber between its port and the piston, and a laterally-balanced reciprocating governing-piston subjected to the low pressure at one end thereof and coöperating with such ports of the casing to open communication at one or the other high-pressure port with the high-pressure chamber and to open communication at one or the other low-pressure port with the low-pressure chamber.

7. A pressure-reducing valve comprising a casing having a high-pressure chamber and a low-pressure chamber, a valve controlling the communication between said chambers, a valve-actuating piston connected with the valve and located in a chamber in the casing, two intermediate pressure-chambers, one in communication with the chamber of the valve-actuating piston at one side of such piston and the other at the other side of such piston, and a governing device controlled by the low-pressure and controlling the admission of high-pressure fluid alternately to one or the other of the intermediate pressure-chambers.

8. A pressure-reducing valve comprising a casing having a high-pressure chamber and a low-pressure chamber, a valve controlling the communication between said chambers, a valve-actuating piston connected with the valve and located in a chamber in the casing, two intermediate pressure-chambers, one in communication with the chamber of the valve-actuating piston at one side of such piston and the other at the other side of such piston, a governing device controlled by the low pressure, and passages in the casing with which such governing device coacts to open communication between the high-pressure chamber and either one of the intermediate pressure-chambers and the low-pressure chamber and the other intermediate pressure-chamber.

9. A pressure-reducing valve comprising a casing having a high-pressure chamber and a low-pressure chamber, a valve controlling the communication between said chambers, a valve-actuating piston connected with the valve and located in a chamber in the casing, two intermediate pressure-chambers, one in communication with the chamber of the valve-actuating piston at one side of such piston and the other at the other side of such piston, adjustable means located in proximity to the piston-chamber for restricting the communication between one of such intermediate pressure-chambers and the chamber of the valve-actuating piston, and a governing device controlled by the low-pressure and controlling the admission of high-pressure fluid alternately to one or the other of the intermediate pressure-chambers.

10. A pressure-reducing valve comprising a casing having a high-pressure chamber and a low-pressure chamber, a valve controlling the communication between said chambers, a valve-actuating piston connected with the valve and located in a chamber in the casing, two intermediate pressure-chambers, one in communication with the chamber of the valve-actuating piston at one side of such piston and the other at the other side of such piston, adjustable means located in proximity to the piston-chamber for restricting the communication between one of such intermediate pressure-chambers and the chamber of the valve-actuating piston, a governing device controlled by the low pressure, and passages in the casing with which such governing device coacts to open communication between the high-pressure chamber and either one of the intermediate pressure-chambers and the low-pressure chamber and the other intermediate pressure-chamber.

11. A pressure-reducing valve comprising a casing having a high-pressure chamber and a low-pressure chamber, a valve controlling the communication between said chambers, a valve-actuating piston connected with the valve and located in a chamber in the casing, two intermediate pressure-chambers, one in communication with the chamber of the valve-actuating piston at one side of such piston and the other at the other side of such piston, and a reciprocating governing piston-valve subjected to the low pressure in one direction, and a resisting device opposing such pressure, the casing being provided with high-pressure ports with which such governing-valve coacts to open communication between the high-pressure chamber and either one of the intermediate chambers, and low-pressure ports with which such governing-valve coacts to open communication between the low-pressure chamber and the other intermediate chamber.

12. A pressure-reducing valve comprising a casing having a high-pressure chamber and a low-pressure chamber, a valve controlling the communication between said chambers, a valve-actuating piston connected with the valve and located in a chamber in the casing, two intermediate pressure-chambers, one in communication with the chamber of the valve-actuating piston at one side of such piston and the other at the other side of such piston, adjustable means for restricting the communication between one of such intermediate pressure-chambers and the chamber of the valve-actuating piston, and a reciprocating governing piston-valve subjected to the low pressure in one direction, and a resisting device opposing such pressure, the casing being provided with high-pressure ports with which such governing-valve coacts to open communication between the high-pressure chamber and either one of the intermediate chambers, and low-pressure ports with which such governing-valve coacts to open communication between the low-pressure chamber and the other intermediate chamber.

13. A pressure-reducing valve comprising a casing having a high-pressure chamber and a low-pressure chamber, a valve controlling the communication between said chambers, an apron on said valve and a coacting wall on the casing located in the high-pressure chamber whereby the fluid is directed around the edges of the valve in its movement in the high-pressure chamber toward the low-pressure chamber, a valve-actuating piston connected with the valve and working in a chamber in the casing, a reciprocating governing piston-valve subjected to the low pressure in one direction, and a resisting device opposing such pressure, the casing being provided with high-pressure ports with which such governing-valve coacts to open communication between the high-pressure chamber and the chamber of the valve-actuating piston at times at one side of the valve-actuating piston and at other times at the other side thereof, and low-pressure ports with which such governing-valve coacts to open communication between the low-pressure chamber and the chamber of the valve-actuating piston at either side thereof opposite to that at which the high pressure is exerted.

14. A pressure-reducing valve comprising a casing having a high-pressure chamber and a low-pressure chamber, a valve controlling the communication between said chambers, an apron on said valve and a coacting wall on the casing located in the high-pressure chamber whereby the fluid is directed around the edges of the valve in its movement in the high-pressure chamber toward the low-pressure chamber, a valve-actuating piston connected with the valve and working in a chamber in the casing, two intermediate pressure-chambers, one in communication with the chamber of the valve-actuating piston at one side of such piston and the other at the other side of such piston, adjustable means for restricting the communication between one of such intermediate pressure-chambers and the chamber of the valve-actuating piston, and a reciprocating governing piston-valve subjected to the low pressure in one direction, and a resisting device opposing such pressure, the casing being provided with high-pressure ports with which such governing-valve coacts to open communication between the high-pressure chamber and either one of the intermediate chambers, and low-pressure ports with which such governing-valve coacts to open communication between the low-pressure chamber and the other intermediate chamber.

In testimony whereof I have affixed my signature in presence of two witnesses.

JOHN B. WARING.

Witnesses:
HENRY D. WILLIAMS,
JOHN H. BARNES.